United States Patent [19]
Rickman et al.

[11] Patent Number: 5,368,134
[45] Date of Patent: Nov. 29, 1994

[54] TANDEM WHEEL BLOCK APPARATUS

[76] Inventors: Harold Rickman; Betty J. Rickman, both of 701 El Capitan Dr., Bolivar, Tenn. 38008

[21] Appl. No.: 138,870

[22] Filed: Oct. 20, 1993

[51] Int. Cl.⁵ .................... B60T 1/00; B60T 3/00
[52] U.S. Cl. .................... 188/2 R; 188/32; 254/133 R
[58] Field of Search ............. 188/2 R, 32, 74; 254/108, 111, 133 R, 45, 89 R

[56] References Cited

U.S. PATENT DOCUMENTS

| | | | |
|---|---|---|---|
| 2,528,011 | 10/1950 | Lucker | 254/111 |
| 3,163,925 | 1/1965 | Ulm | 254/111 X |
| 3,760,906 | 9/1973 | McGee | 188/2 R X |
| 4,694,936 | 9/1987 | Jackson | 188/2 R |

Primary Examiner—Robert J. Oberleitner
Assistant Examiner—Kevin D. Rutherford
Attorney, Agent, or Firm—E. Michael Combs

[57] ABSTRACT

A blocking structure arranged for engaging spaced adjacent wheel members of a tandem wheel organization is provided, such that a ratcheting block member is arranged for movement along a gear rack, with the ratcheting block having a support saddle mounted thereon, the support saddle including spaced spanning plates to engage the adjacent wheels preventing their rotation.

2 Claims, 4 Drawing Sheets

TANDEM WHEEL BLOCK APPARATUS

BACKGROUND OF THE INVENTION

1. Field of the Invention

The field of invention relates to wheel block structure, and more particularly pertains to a new and improved tandem wheel block apparatus wherein the same is arranged to provide for the engagement of adjacent spaced wheels preventing their rotation.

2. Description of the Prior Art

The prior art has heretofore employed various jacking structure such as indicated in U.S. Pat. Nos. 3,938,780; 5,161,782; and 3,479,011.

The instant invention sets forth a manner of providing for a ratcheting jack structure that in lieu of lifting of a vehicle, is arranged to forcibly direct adjacent spanning plates into engagement with adjacent wheels to prevent their rotation. Such wheels are typically found on trailers and the like, wherein in lieu of adequate braking, the instant invention permits the blocking of such wheels preventing their rotation and undue movement of the associated trailer structure and in this respect, the present invention substantially fulfills this need.

SUMMARY OF THE INVENTION

In view of the foregoing disadvantages inherent in the known types of wheel block apparatus now present in the prior art, the present invention provides a tandem wheel block apparatus wherein the same is arranged to effect the projection of an abutment block between spaced adjacent wheel members preventing their rotation. As such, the general purpose of the present invention, which will be described subsequently in greater detail, is to provide a new and improved tandem wheel block apparatus which has all the advantages of the prior art wheel block apparatus and none of the disadvantages.

To attain this, the present invention provides a blocking structure arranged for engaging spaced adjacent wheel members of a tandem wheel organization, such that a ratcheting block member is arranged for movement along a gear rack, with the ratcheting block having a support saddle mounted thereon, the support saddle including spaced spanning plates to engage the adjacent wheels preventing their rotation.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tandem wheel block apparatus which has all the advantages of the prior art wheel block apparatus and none of the disadvantages.

It is another object of the present invention to provide a new and improved tandem wheel block apparatus which may be easily and efficiently manufactured and marketed.

It is a further object of the present invention to provide a new and improved tandem wheel block apparatus which is of a durable and reliable construction.

An even further object of the present invention is to provide a new and improved tandem wheel block apparatus which is susceptible of a low cost of manufacture with regard to both materials and labor, and which accordingly is then susceptible of low prices of sale to the consuming public, thereby making such tandem wheel block apparatus economically available to the buying public.

Still yet another object of the present invention is to provide a new and improved tandem wheel block apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
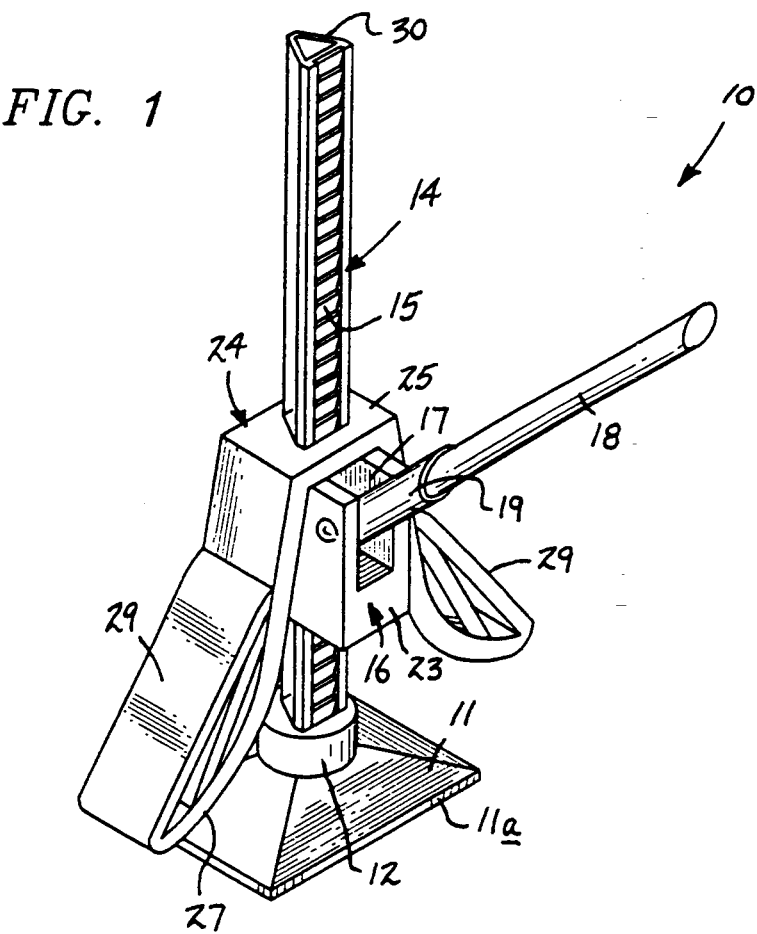
FIG. 1 is an isometric illustration of the invention.

With reference now to the drawings, and in particular to FIGS. 1 to 7 thereof, a new and improved tandem wheel block apparatus embodying the principles and concepts of the present invention and generally designated by the reference numeral 10 will be described.

Figure 2:
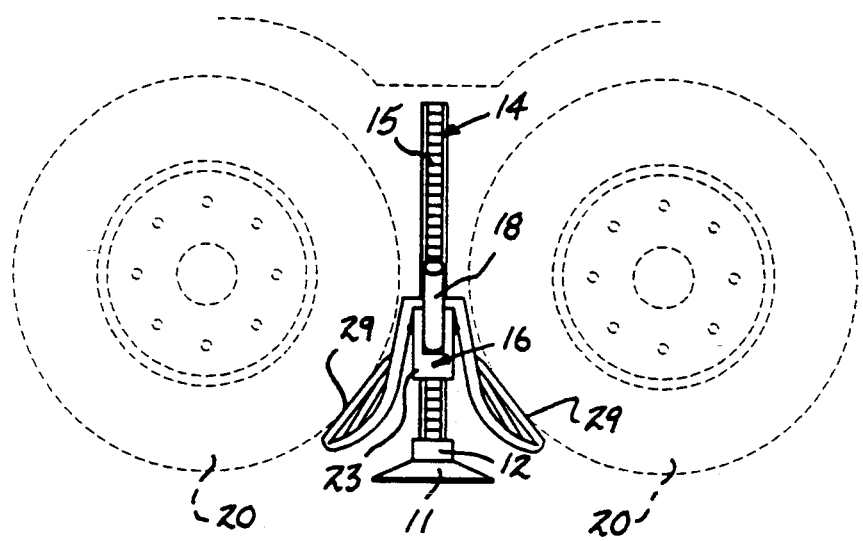
FIG. 2 is an orthographic view of the invention in use.
Figure 3:
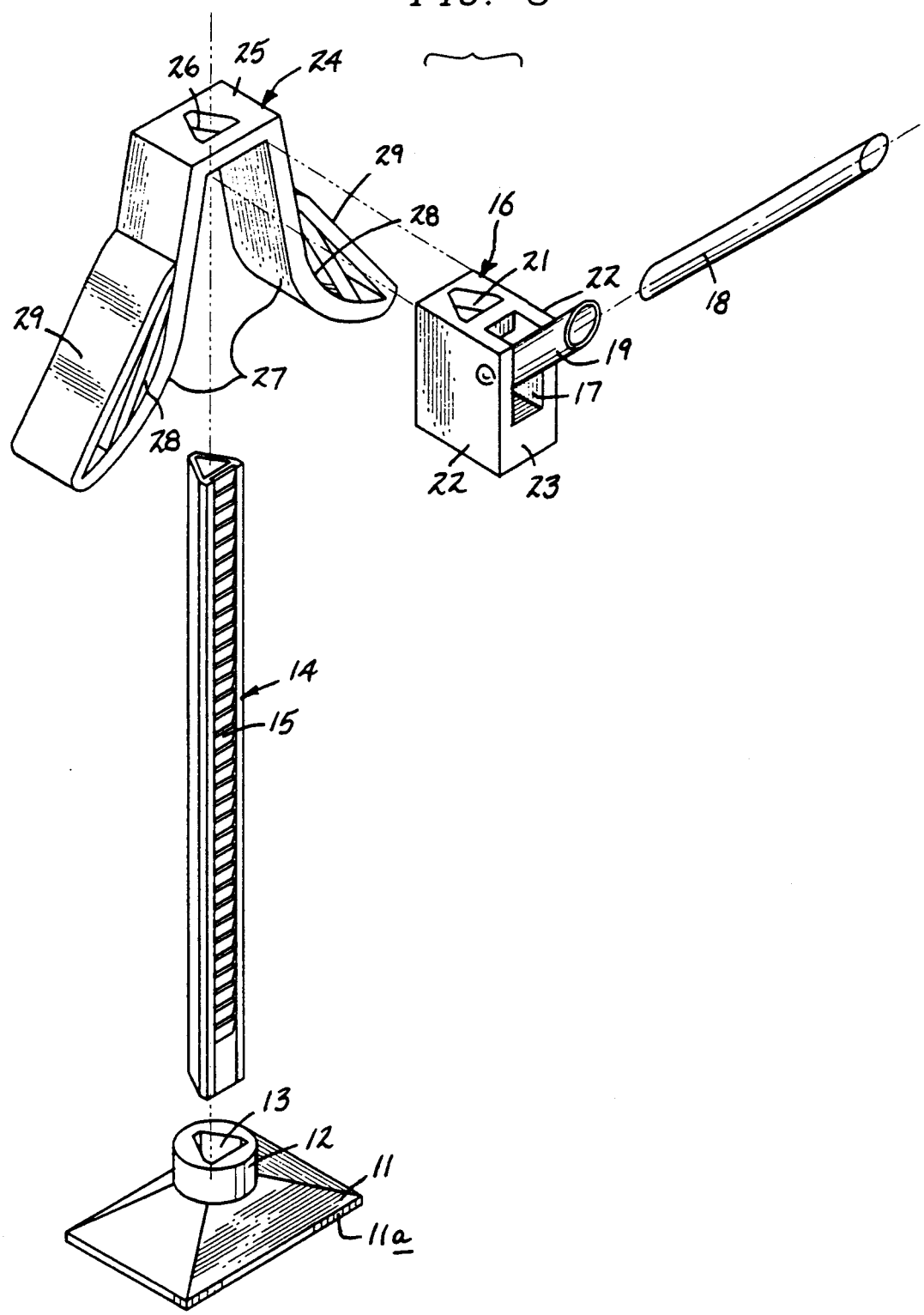
FIG. 3 is an isometric exploded illustration of the invention.

More specifically, the tandem wheel block apparatus 10 of the instant invention essentially comprises a support base plate 11 having a plate periphery 11a, with a base plate socket 12 fixedly mounted to the base plate orthogonally oriented relative to the periphery 11a, such that the base plate socket 12 is formed with a socket cavity 13 to complimentarily receive a lowermost end of the support post 14. The support post 14 includes a gear rack 15 directed therealong cooperative with a ratchet housing 16, with the ratchet housing including a housing recess 17 to receive a drive handle 18 mounted to a drive handle socket 19 within the recess 17. A ratchet housing post receiving bore 21 is directed through the ratchet housing top wall extending through the bottom wall to receive complimentarily the support post 14 therethrough in cooperative ratcheting engagement with the ratchet housing to permit ratcheting of the housing along the gear rack 15. Such ratcheting structure per se is known in the prior art such that has been conventionally provided with production vehicles in a jack structure. The housing 2 includes ratchet housing side walls 22, with a ratchet housing end wall 23 receiving the ratchet housing recess 17 therewithin between the side walls 22 to the ratchet housing top wall, such that a support saddle 24 is arranged for reception upon the ratchet housing top wall. The support saddle 24 includes a support saddle top wall having a top wall opening 26 arranged to receive complimentarily the support post 14 therethrough, with saddle arcuate side plates 27 extending from the support saddle top wall 25 symmetrically oriented about the post 14, with each of the saddle arcuate side wall plates 27 having a concave top wall surface accommodating spanning plates 29 therealong. The spanning plates extend coextensively along the concave top wall surfaces 28. The spanning plates 29 are oriented at an acute included angle relative to the support post 14, in a manner as indicated in FIG. 2, permitting the-orientation of both of the spanning plates 29 in adjacency to an associated wheel member 20 of tandem wheels 20 of an associated vehicle or vehicle trailer, as illustrated. In this manner, ratcheting of the ratcheting block along the support post It effects abutment of the spanning plates 29 with an adjacent wheel 20, or more specifically a tire structure, preventing rotation of the wheels relative to one another and a braking of the associated vehicle and trailer organization.

Figure 4:
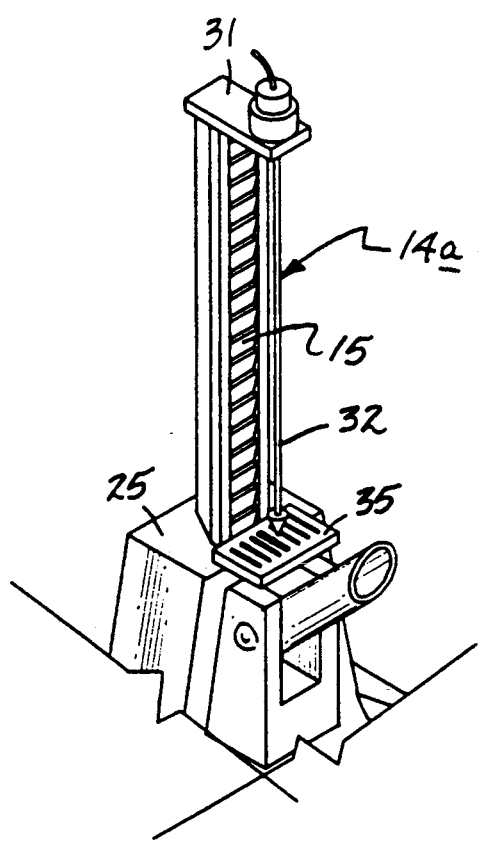
FIG. 4 is an isometric illustration of a modified support post structure.
Figure 5:
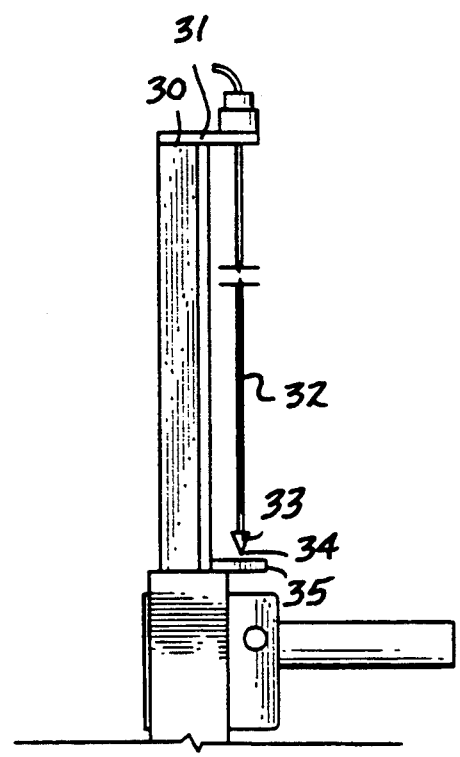
FIG. 5 is an orthographic view of the modified support post structure.

The FIG. 4 indicates the use of a modified support post 14a, wherein the modified support post includes a post uppermost end 30 having fixedly secured thereto a mounting plate 31. A flexible suspension string 32 extends from the mounting plate 31 along the gear rack 15, with a conical bob weight 33 mounted to a lowermost end of the string 32, with the bob weight 33 having a pointed weight end 34 arranged for facing relationship relative to a graduated scale plate 35, that in turn is fixedly secured onto the support saddle top wall 25. In this manner, undue inclination of the apparatus is available to permit reorientation and repositioning of the apparatus to prevent such undue inclination in use.

Figure 6:
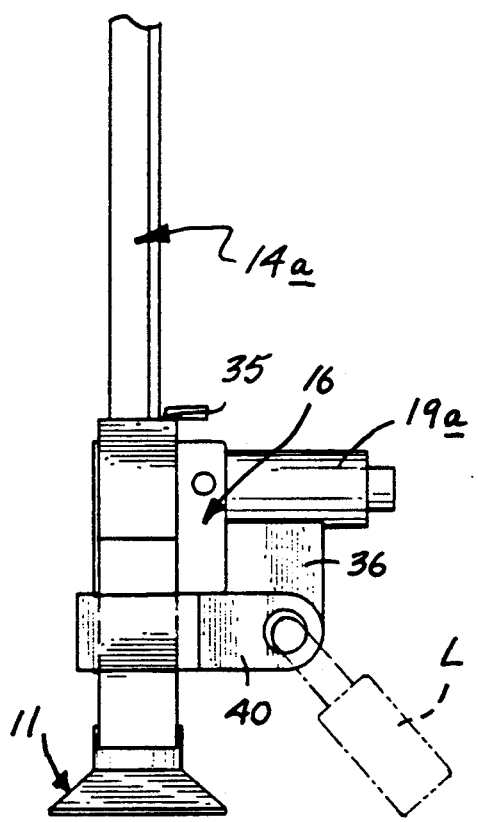
FIG. 6 is an orthographic view of the ratcheting socket arranged for locking relative to an associated lock block structure.
Figure 7:
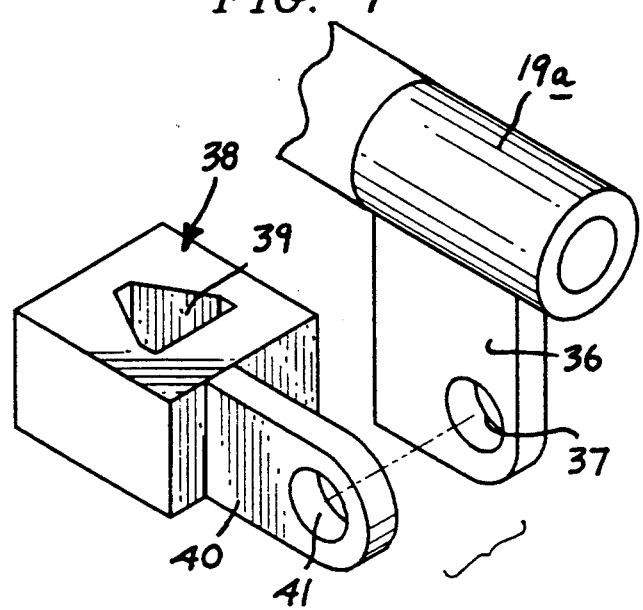
FIG. 7 is an isometric illustration of the lock block arranged for engagement with the handle socket having an associated socket flange.

The FIGS. 6 and 7 indicate the use of a modified handle socket 9 having a socket flange 36, with the socket flange 36 including a socket flange opening 37. A lock block 38 is provided, having a lock block opening 39 directed therethrough to receive the support post 14a slidably therethrough between the ratchet housing 6 and the base plate 1. The lock block 38 having a lock block flange 40 integrally mounted thereto is formed with a block flange opening 41 arranged for alignment with the socket flange opening 37 to receive a lock member "L" through the socket flange opening 37 and the block flange opening 41. In this manner, locking of the ratchet block in a fixed orientation prevents undue tampering and movement of the spanning plates 29 in their support of an associated spaced wheel structure 20.

As to the manner of usage and operation of the instant invention, the same should be apparent from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tandem wheel block apparatus, comprising,
   a base plate, the base plate including a plate periphery, and a base plate socket fixedly mounted to the base plate orthogonally oriented relative to the periphery, with the base plate socket having a base plate socket cavity,
   and
   a support post, the support post complementary received through the socket cavity, the support-post including a gear rack,
   and
   a ratchet housing, the ratchet housing including a ratchet housing top wall spaced from a ratchet housing bottom wall, with a ratchet housing bore extending from the ratchet housing top wall to the ratchet housing bottom wall complimentarily receiving the support post therethrough with the ratchet housing arranged for ratcheting engagement with the support post,
   and
   a support saddle, the support saddle having a saddle top wail, the saddle top wall including a saddle top wall opening arranged for receiving the support post therethrough, and the saddle top wall arranged for abutment with the ratchet housing top wall, the support saddle having spaced arcuate side wall plates extending from the support saddle top wall symmetrically oriented about the support post, with each of the side wall plates including a concave top wall surface, with a spanning plate extending along each concave top wall surface arranged for abutment with an individual wheel member or plurality of spaced tandem wheels, the support post includes a post uppermost end, the post uppermost end including a mounting plate, and a flexible suspension string secured to said mounting plate extending therefrom along the gear rack, with the support post top wall having a graduated scale plate, and the mounting plate including a flexible suspension string extending from the mounting plate, and the suspension string including a bob weight having a pointed end arranged in facing relationship relative to he graduated scale plate.

2. An apparatus as set forth in claim 1 wherein the ratchet housing includes a handle socket, and the handle socket having a socket flange, the socket flange having a socket flange opening, and a lock block, the lock block having a lock block opening extending therethrough, with the lock block opening receiving the support post therethrough, with the lock block oriented between the ratchet housing and the base plate, and the lock block having a lock block flange fixedly mounted to the lock block, with the lock block flange having a block flange opening arranged for alignment with the socket flange opening to receive a lock member directed simultaneously through the socket flange opening and the block flange opening.

* * * * *